May 11, 1926.

H. M. DENYES

STEERING GEAR

Filed August 18, 1924

1,583,962

INVENTOR

Harry M. Denyes

BY

ATTORNEYS

Patented May 11, 1926.

1,583,962

UNITED STATES PATENT OFFICE.

HARRY M. DENYES, OF SAGINAW, MICHIGAN, ASSIGNOR TO GENERAL MOTORS CORPORATION, OF DETROIT, MICHIGAN, A CORPORATION OF DELAWARE.

STEERING GEAR.

Application filed August 18, 1924. Serial No. 732,791.

This invention relates to automobile-controlling devices, and is illustrated as embodied in a steering column assembly with spark and throttle controls, for a Buick automobile.

An object of the invention is to provide an inexpensive concealed substitute for the usual ratchet segment of a control, such as a spark or throttle control, by the use of a novel radially movable friction member or brake bearing against a cylindrical flange arranged coaxially with respect to the steering column, preferably at the top of the steering column. A further object is to lessen the cost of a steering column assembly of this general character, by eliminating the usual fixed top plate, and mounting the horn button or other electrical switch directly in a recess in the control member, or the upper control member if there be several, above the steering wheel.

Figure 2:
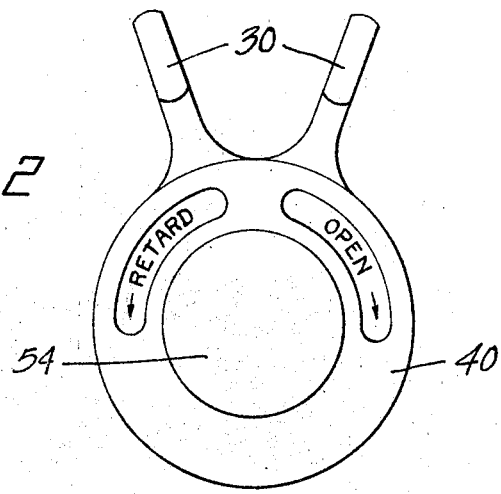
Figure 1:
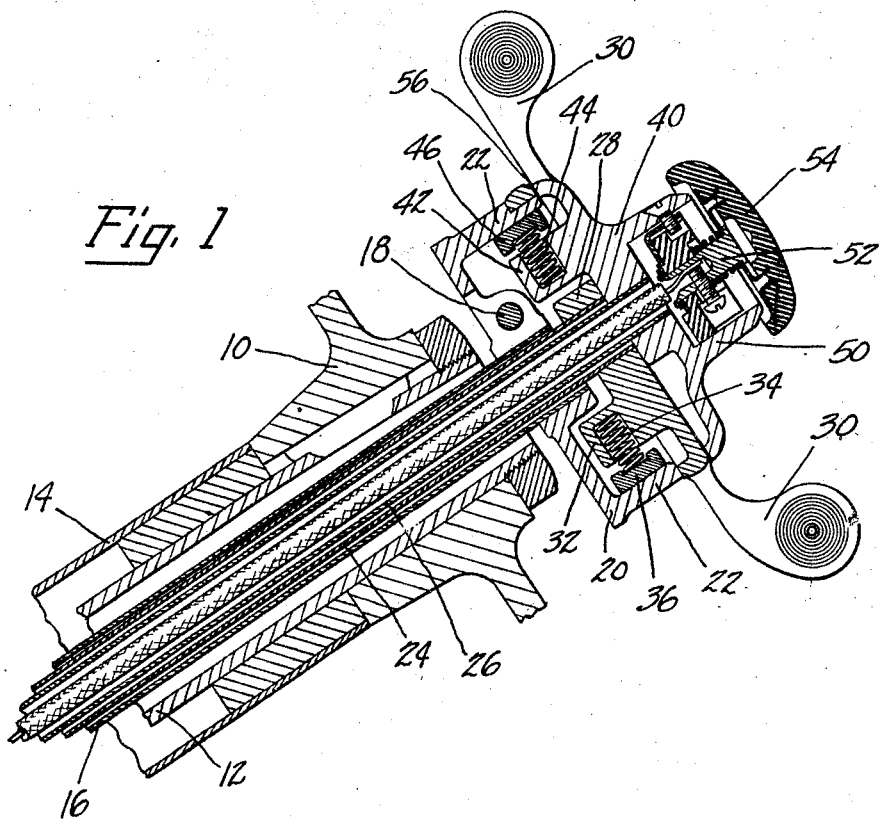

These and other objects of the invention, together with various novel and desirable particular constructions and arrangements, will be apparent from the following description of one illustrative embodiment shown in the accompanying drawing, in which:

Figure 1 is a longitudinal section through the top of the steering column of a Buick automobile, with the spark and throttle controls so displaced as to come substantially opposite each other; and Figure 2 is a top plan view of the spark and throttle controls, in driving position.

In the illustrated arrangement, a steering wheel 10 is arranged to rotate a steering column 12 protected by a stationary housing 14 in the usual manner. A stationary tube 16, within and coaxial with respect to the steering column, is secured by a clamp screw 18 to a stationary member 20 above the steering wheel and having an upwardly-extending cylindrical flange 22 which is also coaxial with respect to the steering column. Spark and throttle control members 24 and 26, shown as tubes, are arranged within the stationary tube. At the upper end of tube 24 is secured an operating member 28 having a handle 30, and formed with a portion 32 extending within the flange 22. The portion 32 is formed with a radially-arranged cylindrical recess for a coil spring 34 urging a friction member or brake 36 radially against the inside of flange 22.

At the upper end of tube 26 is secured an operating member 40, also having a handle 30, and formed with a portion 42 extending within the flange 22. Portion 42 has a cylindrical recess for a coil spring 44 urging a friction member or brake 46 radially against the inside of flange 22. Member 28 is cut away, as appears in Figure 1, so that it does not interfere with angular movement of portion 42 through a space of about 120°, and similarly member 40 is so formed as not to interfere with the necessary movement of portion 32. It will be seen that member 40 has an upper disk-like portion which forms, in effect, the top cover plate, thus eliminating the usual stationary cover plate.

Operating member 40 is provided with a boss 50 having a central recess for an electrical switch 52, of any desired construction, which is connected to an insulated wire 54 passing down through tube 26. The switch may be operated by depressing the horn button 54, or its equivalent to ground the circuit through boss 50. The illustrated switch, which is of standard construction, is described in detail in application No. 670,478, filed October 24, 1923.

If desired, a washer 56 may be placed between the two control members, to prevent any drag of the one control member on the other. This washer is shown as stationary, being carried on one side by the upper edge of flange 22, and it may be held by bending down one or more projections into notches in the edge of the flange.

While one illustrative embodiment has been described in detail, it is not my intention to limit the scope of the invention to that particular embodiment, or otherwise than by the terms of the appended claims.

I claim:

1. A steering assembly comprising, in combination, a steering wheel and a steering column rotated thereby, a stationary supporting tube within the steering column, a member having an upwardly-extending flange and which is secured to the top of the supporting tube above the steering wheel, coaxial control members extending through the supporting tube, an operating member secured to the top of each control member, and friction members carried respectively by said operating members and urged radially outward against the inside of said stationary upwardly-extending flange.

2. A steering assembly comprising, in combination, a steering wheel and a steering column rotated thereby, a stationary support, a member having a cylindrical flange coaxial with respect to the steering column and which is secured to said support, coaxial control members extending through the steering column and through said flange and which are coaxial with respect to the column and flange, a member having a portion within said flange and secured to each control member, and friction brakes carried respectively by said flange-enclosed parts of the members and which brakes are urged radially outward against the inside of said stationary flange.

3. A steering assembly comprising, in combination, a steering wheel and a steering column rotated thereby, a stationary member having a cylindrical flange coaxial with respect to the steering column, a control member extending through the column and flange and coaxial with respect thereto, a member secured to the control member and which has a lug within the flange, the lug having a radially-extending generally cylindrical recess, a friction brake carried by the lug within the flange, and a coil spring in said recess engaging the brake and urging it radially outward against the inside of the flange.

4. A steering assembly comprising, in combination, a steering wheel and a steering column rotated thereby, a stationary supporting tube within the steering column, a member having an upwardly extending flange and which is secured to the top of the supporting tube above the steering wheel, a control member extending through the supporting tube, an operating member secured to the top of said control member, and a radially acting friction device housed within said flange and operating between said flange and said operating member for yieldingly holding said operating member in adjusted position.

5. A steering assembly comprising, in combination, a steering wheel, a steering column rotated thereby, a stationary member arranged above said steering column, means for supporting said stationary member, control shafts nested within each other and within the steering column, operating devices for said control shafts, and radially acting friction devices operating between said operating devices and said stationary member for holding said operating devices in adjusted position.

6. The structure as defined in claim 5, the supporting means for said stationary member passing through said steering column.

In testimony whereof I affix my signature.

HARRY M. DENYES.